US011429412B2

(12) United States Patent
Tsirkin et al.

(10) Patent No.: US 11,429,412 B2
(45) Date of Patent: Aug. 30, 2022

(54) GUEST PROTECTION FROM APPLICATION CODE EXECUTION IN KERNEL MODE

(71) Applicant: Red Hat Israel, Ltd., Ra'anana (IL)

(72) Inventors: Michael Tsirkin, Ra'anana (IL); Paolo Bonzini, Milan (IT)

(73) Assignee: RED HAT ISRAEL, LTD., Ra'anana (IL)

( * ) Notice: Subject to any disclaimer, the term of this patent is extended or adjusted under 35 U.S.C. 154(b) by 1594 days.

(21) Appl. No.: 15/053,899

(22) Filed: Feb. 25, 2016

(65) Prior Publication Data

US 2017/0249173 A1 Aug. 31, 2017

(51) Int. Cl.
| | |
|---|---|
| *G06F 21/79* | (2013.01) |
| *G06F 12/14* | (2006.01) |
| *G06F 21/60* | (2013.01) |
| *G06F 9/455* | (2018.01) |
| *G06F 12/109* | (2016.01) |
| *G06F 21/53* | (2013.01) |
| *G06F 21/62* | (2013.01) |
| *G06F 21/52* | (2013.01) |
| *G06F 12/1009* | (2016.01) |

(52) U.S. Cl.
CPC ........ *G06F 9/45558* (2013.01); *G06F 12/109* (2013.01); *G06F 12/1009* (2013.01); *G06F 21/52* (2013.01); *G06F 21/53* (2013.01); *G06F 21/62* (2013.01); *G06F 2009/45587* (2013.01); *G06F 2212/1052* (2013.01); *G06F 2212/152* (2013.01); *G06F 2212/657* (2013.01); *G06F 2221/2141* (2013.01)

(58) Field of Classification Search
CPC .... G06F 9/45558; G06F 21/53; G06F 3/0622; G06F 3/0637; G06F 21/62; G06F 3/0683; G06F 12/109; G06F 2221/2141; G06F 2212/1052; G06F 2212/152; G06F 2212/657; G06F 2009/45587
See application file for complete search history.

(56) References Cited

U.S. PATENT DOCUMENTS

| | | | |
|---|---|---|---|
| 8,607,013 B2 | 12/2013 | Chen et al. | |
| 9,129,106 B2 | 9/2015 | Sharif et al. | |
| 10,089,024 B2 * | 10/2018 | Tsirkin | G06F 3/0619 |

(Continued)

FOREIGN PATENT DOCUMENTS

EP   3671521 A1 *   6/2020   .......... G06F 11/0745

OTHER PUBLICATIONS

Prashant Dewann, David Durhamn, Hormuzd Khosravin, Men Long, Gayathri Nagabhushan; "A Hypervisor-Based System for Protecting Software Runtime Memory and Persistent Storage"; SpringSim '08: Proceedings of the 2008 Spring simulation multiconference; Apr. 2008; pp. 828-835 (Year: 2008).*

(Continued)

*Primary Examiner* — Shewaye Gelagay
*Assistant Examiner* — Courtney D Fields
(74) *Attorney, Agent, or Firm* — Haynes and Boone, LLP

(57) ABSTRACT

Systems and methods are disclosed for securing an application running on a guest. An example method includes detecting, by a guest running on a virtual machine, that a set of physical memory pages is allocated to an application. The virtual machine runs on a hypervisor, and the application runs on the guest. During runtime, the guest may send a request to the hypervisor to set the set of physical memory pages to an executable-by-user mode in the hypervisor's page tables.

20 Claims, 4 Drawing Sheets

(56) References Cited

U.S. PATENT DOCUMENTS

| | | | |
|---|---|---|---|
| 2012/0254995 A1* | 10/2012 | Sallam | G06F 21/554 |
| | | | 726/22 |
| 2014/0351810 A1 | 11/2014 | Pratt et al. | |
| 2014/0372719 A1 | 12/2014 | Lange et al. | |
| 2015/0082305 A1 | 3/2015 | Hepkin et al. | |
| 2015/0319160 A1 | 11/2015 | Ferguson et al. | |
| 2016/0364341 A1* | 12/2016 | Banginwar | G06F 12/109 |
| 2018/0060103 A1* | 3/2018 | Tsirkin | G06F 9/45545 |
| 2019/0026231 A1* | 1/2019 | Kottilingal | G06F 9/45558 |
| 2020/0201786 A1* | 6/2020 | Ouziel | G06F 11/0745 |

OTHER PUBLICATIONS

Yueqiang Cheng et al., *AppShield: Protecting Applications Against Untrusted Operating System*, Publ Date Oct. 31, 2013, School of Information Systems Singapore Management University, Singapore, http://www.mysmu.edu/phdis2008/yqcheng.2008/appshield-tr.pdf.

*Xen SMEP (and SMAP) Bypass*, Pub. Date Apr. 9, 2015, https://www.nccgroup.trust/uk/about-us/newsroom-and-events/blogs/2015/april/xen-smep-and-smap-bypass/.

Kurbanmagomed Mallachiev et al., *Protecting Applications from Highly Privileged Malware Using Bare-Metal Hypervisor*, Pub. Date 2014, Institute for System Programming of the Russian Academy of Sciences, Moscow, Russian Federation http://syrcose.ispras.ru/2014/files/submissions/10_syrcose2014.pdf.

Cuong Hoang H. Le, *Protecting Xen Hypercalls—Intrusion Detection/Prevention in a Virtualization Environment*, Pub. Date Jul. 2009, The University of British Columbia, https://www.cs.ubc.ca/grads/resources/thesis/Nov09/Le_Cuong.pdf.

* cited by examiner

GUEST PROTECTION FROM APPLICATION CODE EXECUTION IN KERNEL MODE

BACKGROUND

The present disclosure generally relates to computing devices, and more particularly to protecting application code from being executed by the guest while in kernel mode.

A virtual machine is software that is executed on hardware to create a virtualization of a physical computer system. Virtual machines may function as self-contained platforms that run their own operating systems and software applications. A host machine, such as a server computer may concurrently run one or more virtual machines using software that is referred to as a hypervisor. The hypervisor allocates a certain amount of the host's resources, such as the host's underlying physical processors and memory devices, to each of the virtual machines, allowing the virtual machines to transparently access the host's resources. Each virtual machine may use the allocated resources to execute applications, including operating systems referred to as guest operating systems. Each virtual machine guest operating system may be accessed by one or more local or remote clients to perform computing tasks.

Operating system designers and hardware designers tend to put a lot of thought into how the kernel can be protected from user-space processes. The security of the system as a whole depends on that protection. But there can also be value in protecting user space from the kernel.

BRIEF SUMMARY

This disclosure relates to securing application code and protecting it from being executed while the system is in kernel mode. Methods, systems, and techniques for securing application code are provided.

According to an embodiment, a method of securing an application running on a guest includes detecting, by a guest running on a virtual machine, that a set of physical memory pages is allocated to an application. The virtual machine runs on a hypervisor, and the application runs on the guest. The method also includes sending, by the guest, a request to the hypervisor to set the set of physical memory pages to an executable-by-user mode in the hypervisor's page tables.

According to another embodiment, a system for securing an application running on a guest includes a guest that runs on a virtual machine and detects that an application is loaded. The virtual machine runs on a hypervisor. The system also includes an application code protector that detects that a set of physical memory pages is allocated to the application. The system further includes an I/O module that sends a request to the hypervisor to set the set of physical memory pages to an executable-by-user mode in the hypervisor's page tables.

According to another embodiment, a non-transitory machine-readable medium includes a plurality of machine-readable instructions that when executed by one or more processors are adapted to cause the one or more processors to perform a method including: detecting, by a guest running on a virtual machine, that a set of physical memory pages is allocated to an application, the virtual machine running on a hypervisor, and the application running on the guest; and sending, by the guest, a request to the hypervisor to set the set of physical memory pages to an executable-by-user mode in the hypervisor's page tables.

According to another embodiment, an apparatus for securing an application running on a guest includes means for detecting that a set of physical memory pages is allocated to an application, the virtual machine running on a hypervisor, and the application running on the guest; and sending a request to the hypervisor to set the set of physical memory pages to an executable-by-user mode in the hypervisor's page tables.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
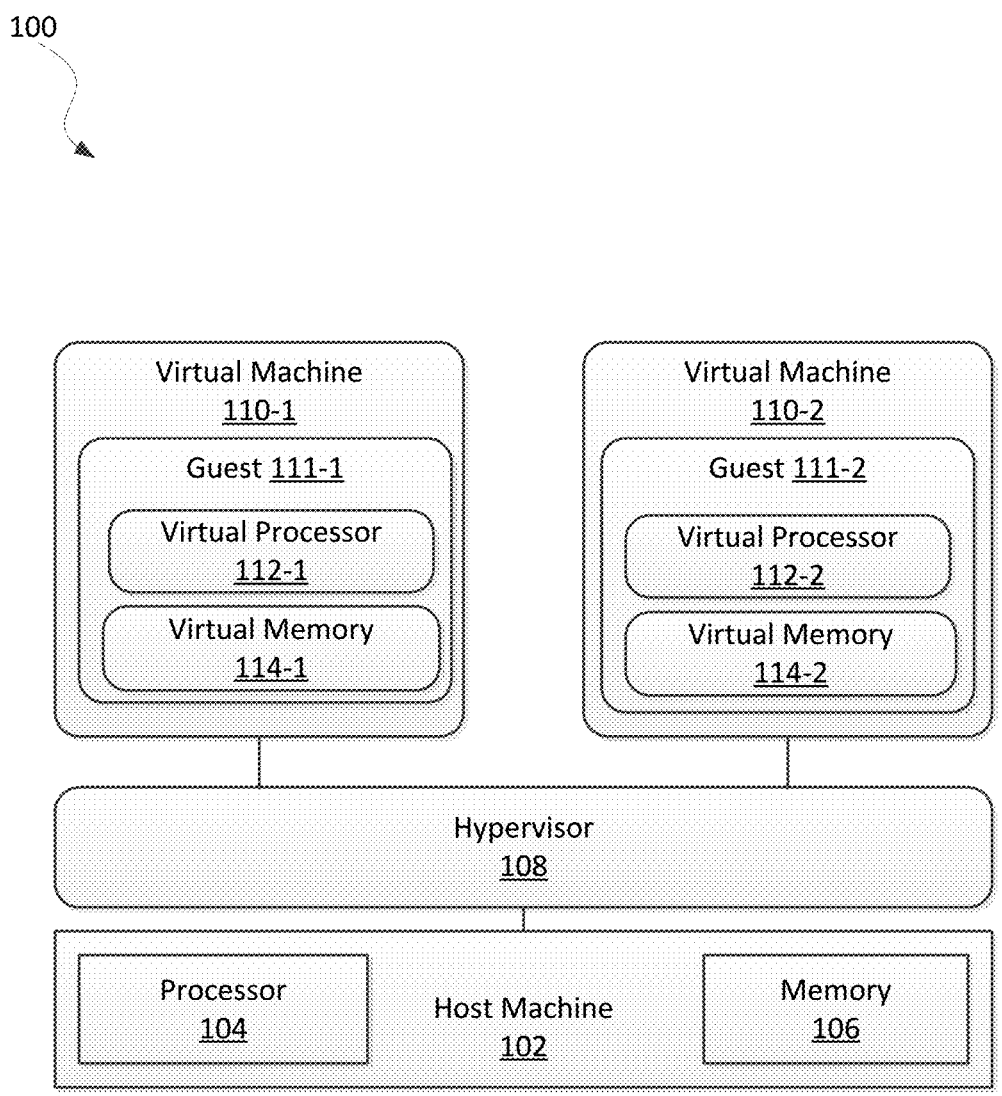
FIG. 1 is a diagram showing a host system in accordance with one or more embodiments.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture
III. Secure Application Code from Kernel Mode Execution
IV. Example Method
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Some processor technologies support protecting execution of application code from kernel space. For example, the "Supervisor Mode Access Prevention" (SMAP) feature prevents kernel access to application memory unless enabled by means of a special instruction. In another example, the "Supervisor Mode Execution Protection Enable" (SMEP) feature prevents the kernel from executing code from application memory. These technologies, however, pose some problems. For example, the SMAP and SMPEP features are not available on all processors. Additionally, the kernel may still access or execute memory using an alternate memory mapping. It may be desirable to overcome these problems. The present disclose provides techniques to secure application code and protect it from being executed while the system is in kernel mode. The application code may be made more secure by using the hypervisor.

Unless specifically stated otherwise, as apparent from the following discussion, it is appreciated that throughout the description, discussions utilizing terms such as "determining," "storing," "detecting," "receiving," "sending," "reading," "marking," "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 is a diagram showing an illustrative host system 100. According to the present example, a physical system, such as host machine 102 includes hardware such as processor 104 for executing software (e.g., machine readable instructions) and using or updating data stored in memory 106. Processor 104 may represent one or more processors acting in concert. A "processor" may also be referred to as a "CPU" or "physical processor" herein. A processor shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single-core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Memory 106 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and are often referred to as "working memory." The various types of memory may store information in the form of software and data. The software may include an operating system, a hypervisor 108, and various other software applications.

Hypervisor 108 supports a first virtual machine 110-1 having a first virtual processor 112-1 and a first virtual memory 114-1. Hypervisor 108 also supports a second virtual machine 110-2 having a second virtual processor 112-2 and a second virtual memory 114-2. Although two virtual machines 110 are illustrated, other examples include fewer than two virtual machines or more than two virtual machines.

In the present example, virtual machines 110 are platforms on which operating systems referred to as guest operating systems run. The guest operating systems may be referred to as "guests." A guest 111-1 running on the first virtual machine 110-1 may be a different operating system than guest 111-2 running on the second virtual machine 110-2. Guests may also be different operating systems than the operating system running on host machine 102.

Host machine 102 may run one or more virtual machines that run applications and services. Hypervisor 108 manages resources of host machine 102 and makes them available to one or more guests that may be alternately or concurrently executed by host machine 102. Hypervisor 108 may manage hardware resources and arbitrate requests of the multiple guests. For example, hypervisor 108 may present a virtual set of CPU, memory, input/output (I/O), and disk resources to each guest based on the physical hardware and/or based on a standard and consistent selection of custom hardware. A virtual machine 110 is provided its own address space in memory, its own processor resource allocation, and its own device I/O using its own virtual device drivers.

The hardware resources of host machine 102 are shared among hypervisor 108 and one or more guests. Hypervisor 108 may map a virtual resource or state (e.g., registers, memory, or files) to resources in the underlying host machine 102. For example, hypervisor 108 may present a virtual memory 114-1 to virtual machine 110-1 and may also present a virtual memory 114-2 to virtual machine 110-2.

Hypervisor 108 maps the virtual memory locations of virtual memory 114, referred to as virtual memory locations, to physical memory locations of memory 106 using page tables. These pages tables may be stored in a virtual memory, such as virtual memory 114-1 in order to be accessible to virtual machine 110-1. A page table may be a guest page table or a hypervisor page table. A guest page table is a data structure that stores mappings between the virtual addresses of virtual memory 114 and the guest physical addresses of virtual memory 114. A hypervisor page table is a data structure that stores mappings between the guest physical addresses of virtual memory 114 and the host physical addresses of memory 106. A hypervisor page table may also be referred to as an extended page table (EPT).

Host machine 102 may be coupled over a network (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

III. Secure Application Code from Kernel Mode Execution

Figure 2:
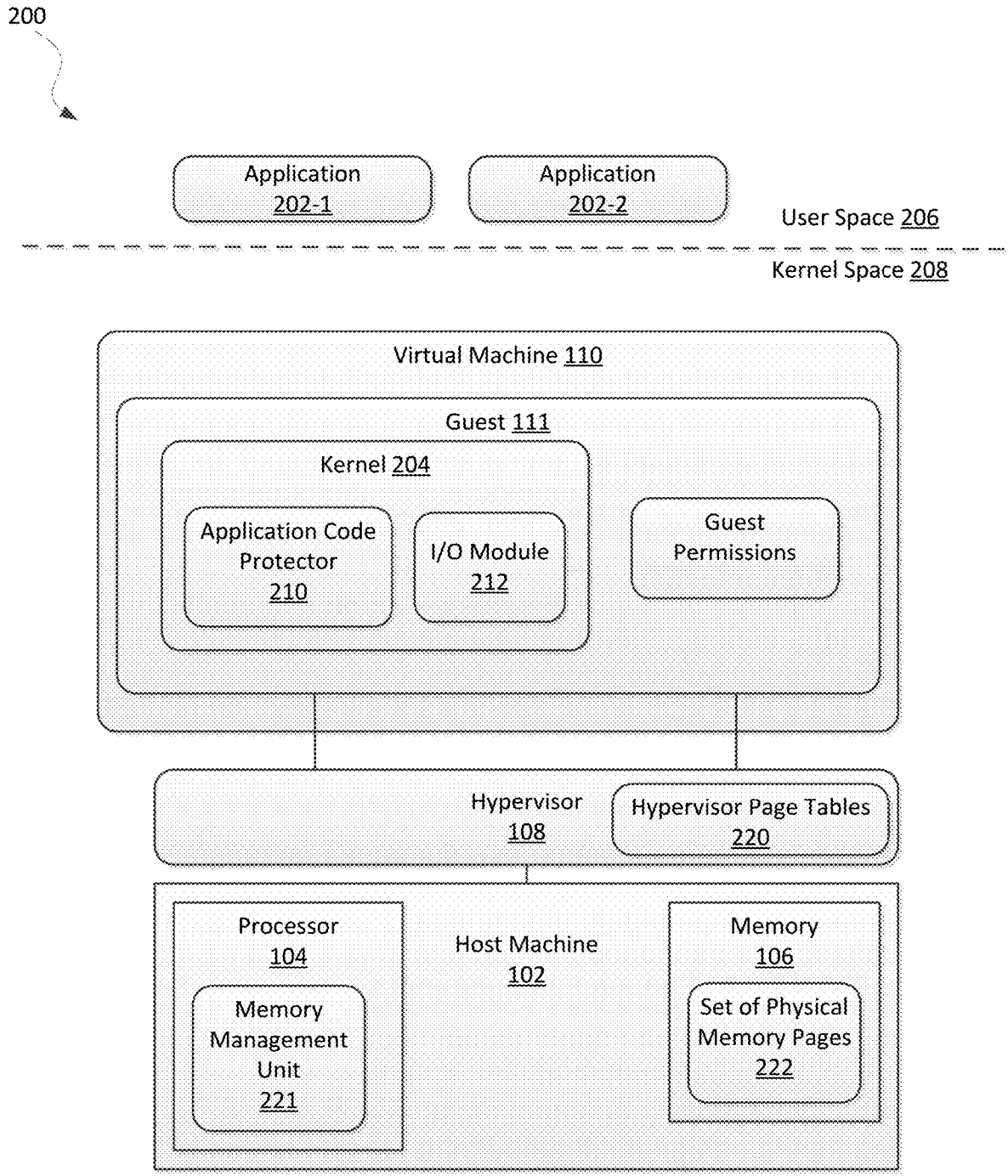
FIG. 2 is a block diagram illustrating a system for securing an application running on a guest in accordance with one or more embodiments.

FIG. 2 is a block diagram 200 illustrating a system for securing an application running on a guest in accordance with one or more embodiments. As illustrated in FIG. 2, guest 111 may execute one or more applications 202 that use resources of host machine 102. Application 202-1 and/or application 202-2 may have several processes executing on host machine 102. Although two applications are illustrated in FIG. 2, it should be understood that more than two applications or fewer than two applications may execute on guest 111. Guest 111 may include an operating system (OS) kernel 204 that serves as an intermediary between hardware and software (e.g., application 202).

The system memory of host machine 102 may be divided into two distinct regions: a user space 206 and a kernel space 208. Application 202 may execute in user space 206, which includes a set of memory locations in which user processes run. A process is an executing instance of a program. Kernel 204 may execute in a kernel space 208, which includes a set of memory locations in which kernel 204 executes and provides its services. The kernel lives in a different portion of the virtual address space from the user space.

Kernel space 208 may be accessed by application 202 through the use of system calls. Kernel 204 abstracts components of hardware 204 on a high level such that application 202 may send a request that is processed by a hardware device without knowing the fine details of the hardware device. For example, to interact with a hardware device, application 202 may invoke a system call into kernel 204. For example, application 202 may send an I/O request to kernel 204 via a system call to request that a particular hardware device perform a particular action. A system call may refer to a request by an active process for a service performed by kernel 204. An example request may be an I/O or process creation request. An active process is a process that is currently processing in processor 104, as contrasted with a process that is waiting for its next turn in processor 104. I/O may be any program, operation, or device that transfers data to or from processor 104 and to or from a hardware device (e.g., disk drives, keyboards, mice, and printers). In another example, guest 111 invokes a hypercall that causes hypervisor 108 to set permissions of a set of memory pages corresponding to memory allocated to the guest to a particular access mode.

Kernel 204 may manage resources of host machine 102 when one or more applications are running on host machine 102. In an example, kernel 204 may share available resources (e.g., CPU time, disk space, and network connections) between various system processes while at the same time ensuring system integrity. In an example, kernel 204 is a LINUX® kernel. Trademarks are the property of their respective owners.

Kernel 204 may use a memory management technique called virtual memory, which maps virtual addresses used by an application into physical addresses in memory 106. In a virtual memory system, the addresses seen by user programs do not directly correspond to the physical addresses used by the hardware. Processor 104 includes a memory management unit (MMU) 221 that supports the use of virtual memory. With MMU 221, memory addresses may go through a translation step from a virtual address to a physical address prior to each memory access. Memory 106 may include random access memory (RAM), and MMU 221 may divide the RAM into pages. A page is a contiguous section of memory of a set size that is handled by MMU 221 as a single entity.

Each application has its own address space that is segregated from all other applications. Kernel 204 maintains data structures that map the virtual memory of each application into the physical memory of the computer. The data structures may be page tables that establish an association between the virtual addresses of a user process and the physical memory of the system. For each application executing in host machine 102, kernel 204 may create a set of page tables to map virtual addresses assigned to the respective application to physical address in memory 106. Additionally, kernel 204 may maintain separate pages tables for each application.

Applications 202 are run in user mode, and this prevents the applications from accessing the data in other programs. It may be desirable to protect kernel 204 from executing application code while virtual machine 110 is in kernel mode. In some examples, kernel 204 may use the services of hypervisor 108 to provide more security to the application code. In an embodiment, kernel 204 maintains one or more mappings from a guest virtual memory address to a guest physical address, and the one or more guest virtual memory addresses are allocated to application 202-1. Kernel 204 sets permissions on the guest virtual memory addresses by, for example, setting a set of virtual memory pages stored at the guest virtual memory addresses in accordance with the desired permissions. Setting a set of virtual memory pages to a desired permission may refer to setting the virtual memory addresses at which the virtual memory pages are stored to the desired permission.

Hypervisor 108 maintains hypervisor page tables 220, which may also be referred to as extended page tables. Hypervisor page tables 220 include one or more mappings from a guest physical address to a host physical address. Hypervisor 108 sets permissions on the guest physical addresses by, for example, setting a set of physical memory pages stored at the guest physical memory addresses in accordance with the desired permissions in hypervisor page tables 220. Setting a set of physical memory pages to a desired permission may refer to setting the physical memory addresses at which the physical memory pages are stored to the desired permission.

Examples of access permissions are read-only, write-only, read-execute only, read-write only, and read-write-execute only. If application 202 has read-only access permission to a memory page, application 202 can only read the data stored at the memory page. In such a scenario, application 202 is unable to write to that memory page. If application 202 has write-only access permission to a memory page, application 202 can only write data to the memory page. In such a scenario, application 202 is unable to read from that memory page. If application 202 has read-write access permission to a memory page, application 202 can read the data stored at the memory page and write data to the memory page.

Multiple virtual addresses pointing to the same physical address may be set to different permissions, but this can make it easier to execute malicious code. A memory page may additionally be set to other various access permissions, depending on the memory page's usage. In an example, a memory page may be set to an executable-by-kernel mode. A memory page that is set to the executable-by-kernel mode is executable in kernel space 208 but not executable in user space 206. Kernel pages may include kernel data and/or kernel executable code. A memory page that stores kernel executable code should typically be set the executable-by-kernel mode.

In another example, a memory page may be set to an executable-by-user mode. A memory page that is set to the executable-by-user mode is executable in user space 206 but not executable in kernel space 208. In another example, a memory page may be set to an executable-by-none mode. A memory page that is set to the executable-by-none mode is not executable at all (e.g., not executable in kernel space 208 or in user space 206). A memory page that stores kernel data should typically be set to the executable-by-none mode. A memory page that stores data read from disk may be set to the executable-by-user mode or executable-by-none mode, depending on whether executing data from that disk is allowed.

Anonymous memory may refer to memory that is not backed by persistent storage (e.g., a disk or a networked file system). A memory page that stores anonymous memory may be set to the executable-by-user mode or executable-by-none mode, depending on whether an application needs execution permission for this anonymous memory page. If a page of anonymous memory is private to the application, kernel 204 knows that only one page table should point to the physical memory address corresponding to the anonymous page, and only one virtual memory address with this page table should point to this physical memory address. In this example, application code protector 210 may set the anonymous page to the executable-by-none mode if the application does not request execution permission for this page.

In an example, hypervisor 108 sets all physical memory pages except memory pages storing kernel executable code to the executable-by-none mode in hypervisor page tables 220. Kernel 204 may pass a range of guest physical memory addresses corresponding to memory pages that store the kernel executable code to hypervisor 108. In an example, kernel 204 detects the loading of application 202-1 and a range of guest physical memory addresses that should be executable by the application. Guest 111 may invoke a hypercall enabling passing the guest physical memory addresses at which the memory pages storing the kernel executable code are stored, requesting permission to execute these memory pages. Hypervisor 108 may set the memory pages that are outside of this range of guest physical memory addresses to be not executable while virtual machine 110 is in kernel mode. The memory pages that are outside of this range of guest physical memory addresses may or may not be executable while virtual machine 110 is in user mode, depending on the memory page's usage.

In FIG. 2, kernel 204 includes an application code protector 210 and an I/O module 212. In some examples, application code protector 210 detects that application 202-1 is being loaded and determines which guest physical memory pages allocated to the application should be executable. Application code protector 210 may send a request for permission to execute the physical memory pages storing executable application code to hypervisor 108. The request may include the guest physical memory addresses of these memory pages. In some examples, application code protector 210 invokes a hypercall and passes the guest physical addresses of the physical memory pages, requesting permission to execute these pages. Hypervisor 108 receives the request and enables execution by modifying the permissions in hypervisor page tables 220. Hypervisor 108 may set bits in hypervisor page tables 220 based on the requested access permissions. The hypercall may be used by application code protector 210 to manipulate the permissions in hypervisor page tables 220.

Guest 111 maintains one or more mappings from a guest virtual memory address to a guest physical address, and sets permissions on the guest virtual memory addresses. The one or more guest virtual memory addresses are allocated to application 202-1. In some embodiments, guest 111 detects that a set of physical memory pages 222 is allocated to application 202-1. In an example, application memory allocated to application 202-1 may be mapped to set of physical memory pages 222 corresponding to a set of guest physical memory addresses. Set of physical memory pages 222, which may store data or executable code of application 202-1, would not be executed while virtual machine 110 is in kernel mode because set of physical memory pages 222 is application memory. Application executable code may be executed while virtual machine 110 is in the user mode and should be set to the executable-by-user mode. Application data should not be executed at all and should be set to the executable-by-none mode.

If set of physical memory pages 222 is allocated to application 202-1, it may be desirable for application code protector 210 to secure the application code and set permissions on set of physical memory pages 222 such that kernel 204 is not allowed to execute set of physical memory pages 222. Application code protector 210 may set the permissions on the virtual memory addresses corresponding to set of physical memory pages 222. For example, application code protector 210 may set the virtual memory pages corresponding to the virtual memory addresses to the executable-by-user mode.

Additionally, I/O module 212 may send a request to hypervisor 108 to set the set of physical memory pages 222 to the executable-by-user mode in hypervisor page tables 220. The request may include the guest physical memory addresses of set of physical memory pages 222. In an example, I/O module 212 sends the request by invoking a hypercall that causes hypervisor 108 to set the corresponding physical memory pages to the executable-by-user mode in hypervisor page tables 220. In response to the request, hypervisor 108 modifies hypervisor page tables 220 to set the given physical memory pages to the executable-by-user mode. Hypervisor 108 may modify hypervisor page tables 220 such that execution from the physical memory addresses of set of physical memory pages 222 is forbidden. In this way, kernel 204 may use hypervisor 108 as a further security mechanism for protecting application code from being executed while virtual machine 110 is in kernel mode. Additionally, the present disclosure may prevent the execution of random data from application memory.

In some examples, kernel 204 determines whether application 202-1 has requested execution permissions for one or more memory pages of set of physical memory pages 222. In response to a determination that application 202-1 has requested execution permissions for a memory page of set of physical memory pages 222, kernel 204 sets the memory page to the executable-by-user mode. In response to a determination that application 202-1 has not requested execution permissions for a memory page of set of physical memory pages 222, kernel 204 sets the memory page to the executable-by-none mode.

In some examples, an application may map a file from a non-executable file system. If the application is a guest user space application, I/O module 212 may send a request to hypervisor 108 to set the mapped page to the executable-by-none mode.

If memory is swapped out, kernel 204 may unmap the memory from the application and request from hypervisor 108 that protection be removed when the memory is moved (e.g., compaction). In an example, kernel 204 may unmap the memory from the old memory address and request from hypervisor 108 that protection be removed from the old memory page stored at the old memory address and enabled on the new memory page, which may be stored at a new memory address. Kernel 204 may map the new memory address into the application.

As discussed above and further emphasized here, FIGS. 1 and 2 are merely examples, which should not unduly limit the scope of the claims.

IV. Example Method

Figure 3:
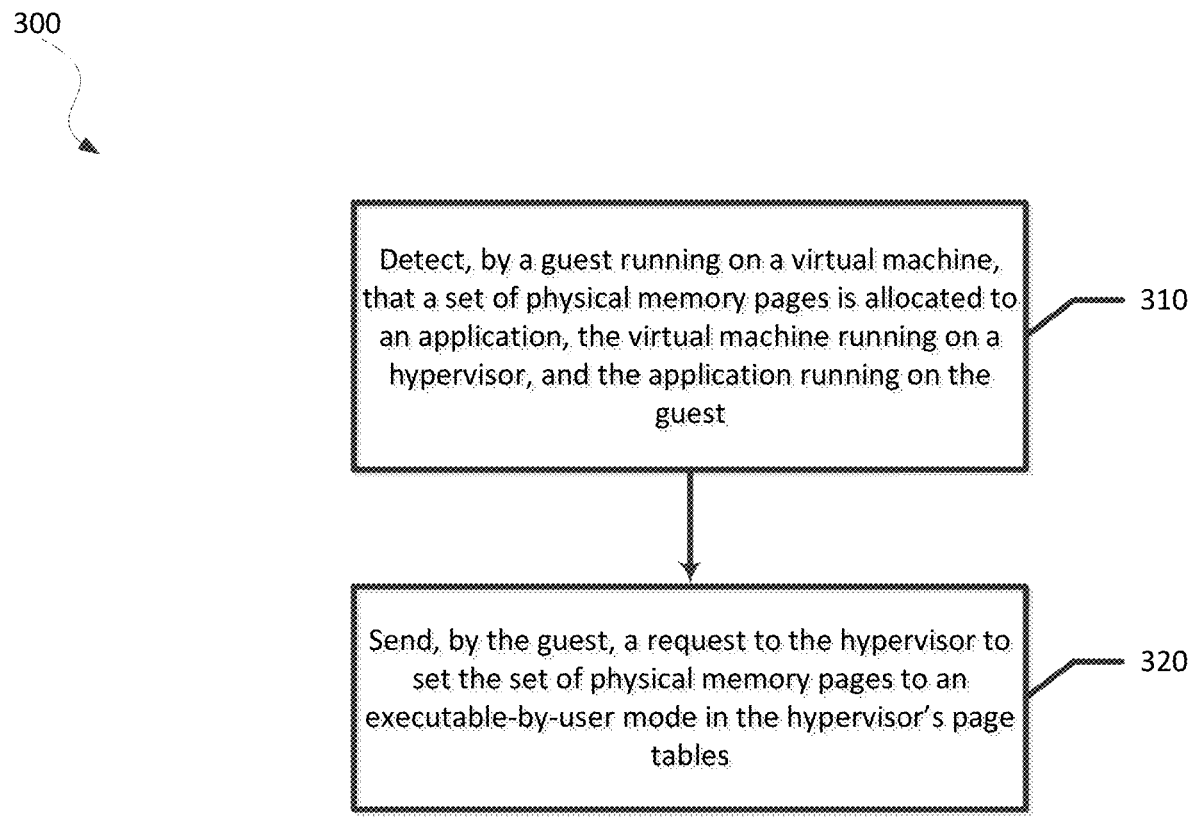
FIG. 3 is a flowchart illustrating a method of securing an application running on a guest in accordance with one or more embodiments.

FIG. 3 is a flowchart illustrating a method 300 of securing an application running on a guest in accordance with one or more embodiments. Method 300 is not meant to be limiting and may be used in other applications.

Method 300 includes blocks 310 and 320. In a block 310, application code protector 210 detects that a set of physical memory pages is allocated to an application, the virtual machine running on a hypervisor, and the application running on the guest. In a block 320, I/O module 212 sends a request to hypervisor 108 to set the set of physical memory pages to an executable-by-user mode in the hypervisor's page tables.

It is also understood that additional processes may be performed before, during, or after blocks 310 and 320 discussed above. For example, application code protector 210 controls permissions on the virtual memory addresses and may also set the virtual memory addresses corresponding to the set of physical memory pages to the executable-by-user mode. The present disclosure may provide the application with an extra layer of protection and prevent application code from being executed while the system is in kernel mode. It is also understood that one or more of the blocks of method 300 described herein may be omitted, combined, or performed in a different sequence as desired.

V. Example Computing System

Figure 4:
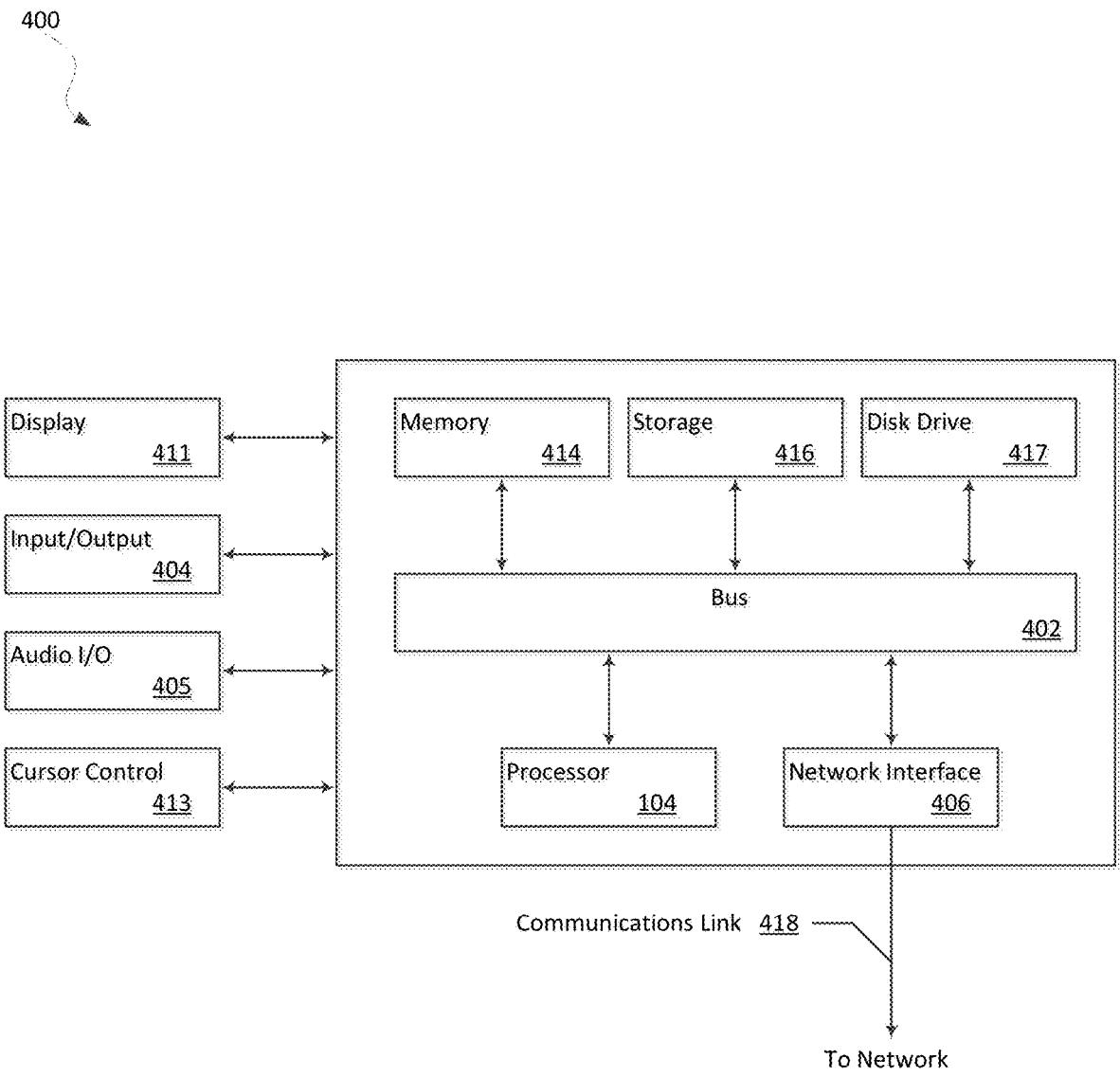
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, host machine 102 may include one or more processors and may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.).

An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. Processor 104, which may be a micro-controller, digital signal processor (DSP), or other processing component, processes these various signals, such as for display on display 411 coupled to computer system 400 or transmission to other devices via communication link 418. Processor 104 may also control transmission of information, such as cookies or IP addresses, to other devices.

Components of computer system 400 also include a system memory component 414 (e.g., RAM), a static storage component 416 (e.g., ROM), and/or a disk drive 417. Memory 106 (see FIG. 1) may include system memory component 414, static storage component 416, and/or disk drive 417.

Computer system 400 performs specific operations by processor 104 and other components by executing one or more sequences of instructions contained in system memory component 414. Logic may be encoded in a computer readable medium, which may refer to any medium that participates in providing instructions to processor 104 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 300) to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of securing an application running on a guest, comprising:
   detecting, by a guest running on a virtual machine, that a set of physical memory pages is allocated to an application, the virtual machine running on a hypervisor, and the application running on the guest;
   sending, by the guest, a request that causes the hypervisor to set the set of physical memory pages to an executable-by-user mode in the hypervisor's page tables, wherein each memory page that is set to the executable-by-user mode in the hypervisor's page tables is executable in user space and is not executable in kernel space; and
   after sending the request, detecting, by the guest, execution of a physical memory page of the set of physical memory pages by the application.

2. The method of claim 1, wherein application memory allocated to the application is mapped to the set of physical memory pages stored at a set of guest physical memory addresses.

3. The method of claim 1, wherein sending the request includes invoking a hypercall that causes the hypervisor to set the physical memory pages to the executable-by-user mode in the hypervisor's page tables.

4. The method of claim 1, wherein the guest maintains one or more mappings from a guest virtual memory address to a guest physical address and sets permissions on the guest virtual memory addresses, and wherein the one or more guest virtual memory addresses are allocated to the application.

5. The method of claim 4, wherein the hypervisor maintains hypervisor pages tables including one or more mappings from a guest physical address to a host physical address and sets permissions on the guest physical addresses.

6. The method of claim 4, further comprising:
   determining, by the guest, whether the application has requested execution permissions for the set of physical memory pages;
   in response to a determination that the application has requested execution permissions for the set of physical memory pages, setting a set of virtual memory pages corresponding to the set of physical memory pages to the executable-by-user mode; and
   in response to a determination that the application has not requested execution permissions for the set of physical memory pages, setting the set of virtual memory pages corresponding to the set of physical memory pages to an executable-by-none mode.

7. The method of claim 1, wherein the set of physical memory pages stores application code including data or executable code of the application.

8. A system for securing an application running on a guest, comprising:
   a guest that runs on a virtual machine and detects that an application is loaded, wherein the virtual machine runs on a hypervisor;
   a memory for storing the hypervisor's page tables;
   an application code protector that detects that the set of physical memory pages is allocated to the application; and
   an I/O module that sends a request that causes the hypervisor to set the set of physical memory pages to an executable-by-user mode in the hypervisor's page tables, wherein each memory page that is set to the executable-by-user mode in the hypervisor's page tables is executable if the virtual machine is in a user mode and is not executable if the virtual machine is in a kernel mode,
   wherein after the I/O module sends the request, the guest detects execution of a physical memory page of the set of physical memory pages by the application.

9. The system of claim 8, wherein application memory allocated to the application is mapped to the set of physical memory pages stored at a set of guest physical memory addresses.

10. The system of claim 8, wherein the guest invokes a hypercall that causes the hypervisor to set the physical memory pages to the executable-by-user mode in the hypervisor's page tables.

11. The system of claim 8, wherein the guest maintains one or more mappings from a guest virtual memory address to a guest physical address and sets permissions on the guest virtual memory addresses, and wherein the one or more guest virtual memory addresses are allocated to the application.

12. The system of claim 11, wherein the hypervisor maintains hypervisor pages tables including one or more mappings from a guest physical address to a host physical address and sets permissions on the guest physical addresses.

13. The system of claim 11, wherein the guest determines whether the application has requested execution permissions for the set of physical memory pages, wherein in response to a determination that the application has requested execution permissions for the set of physical memory pages, the guest sets a set of virtual memory pages corresponding to the set of physical memory pages to the executable-by-user mode, and wherein in response to a determination that the application has not requested execution permissions for the set of physical memory pages, the guest sets the set of virtual memory pages corresponding to the set of physical memory pages to an executable-by-none mode.

14. The system of claim 8, wherein the set of physical memory pages stores application code including data or executable code of the application.

15. The system of claim 8, wherein the hypervisor sets the physical memory pages to an executable-by-none mode in the hypervisor's page tables.

16. The system of claim 15, wherein application code protector sends a range of guest physical memory addresses corresponding to memory pages storing kernel executable code to the hypervisor.

17. The system of claim 16, wherein the hypervisor sets the memory pages that are outside of the range of guest physical memory addresses to the executable-by-user mode or the executable-by-none mode.

18. A non-transitory machine-readable medium comprising a plurality of machine-readable instructions that when executed by one or more processors is adapted to cause the one or more processors to perform a method comprising:
   detecting, by a guest running on a virtual machine, that a set of physical memory pages is allocated to an application, the virtual machine running on a hypervisor, and the application running on the guest;
   sending, by the guest, a request that causes the hypervisor to set the set of physical memory pages to an executable-by-user mode in the hypervisor's page tables, wherein each memory page that is set to the executableby-user mode in the hypervisor's page tables is executable in user space and is not executable in kernel space; and after sending the request, detecting, by the guest, execution of a physical memory page of the set of physical memory pages by the application.

19. The method of claim 1, further comprising:

determining, by the guest, that one or more physical memory pages of the set of physical memory pages stores executable code of the application.

20. The system of claim 8, wherein the guest includes a kernel that does not, based on the hypervisor's page tables, have permission to execute the set of physical memory pages.

* * * * *